July 7, 1942.   D. C. BRETT   2,289,096
FISHING LURE
Filed June 12, 1941
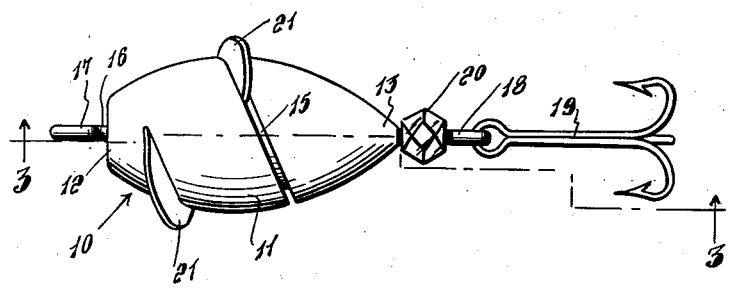
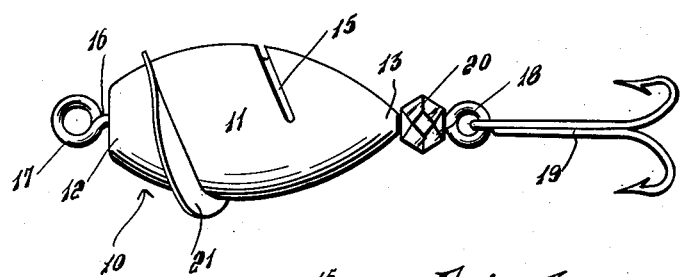
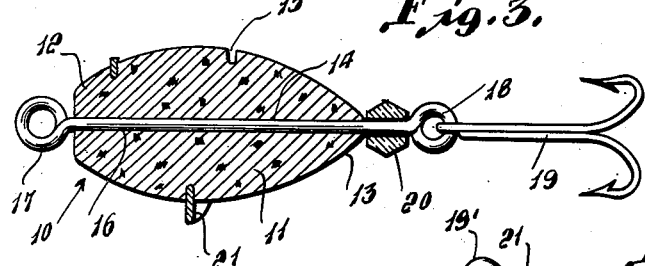
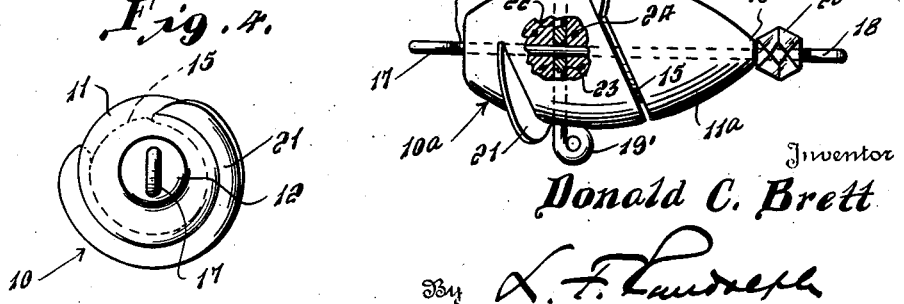
Inventor
Donald C. Brett Patented July 7, 1942

2,289,096

UNITED STATES PATENT OFFICE 2,289,096

FISHING LURE

Donald C. Brett, Parma, Idaho

Application June 12, 1941, Serial No. 397,798

5 Claims. (Cl. 43—47)

This invention relates to a novel construction of fishing lure, and more particularly to a combination spoon and plug type lure which functions both as a spoon and as a plug.

More particularly, it is an aim of the invention to provide a fishing lure including a body member rotatably mounted on a rod which extends longitudinally therethrough, and which is provided with a spiral spoon or blade which projects therefrom and which functions as an impeller, actuated by the lure being drawn through the water, for revolving the body member, and which is formed of metal and polished so that it will flash, as it revolves in the water, for attracting fish.

Still another aim of the invention is to provide a lure having a buoyant lure body and a spiral groove in which said blade is disposed and adjustably mounted for balancing the lure body.

Still a further aim of the invention is to provide a lure, wherein the blade may be made sufficiently heavy to render the lure non-buoyant and wherein the blade is adjustable relatively to the buoyant body member for balancing the non-buoyant lure.

Other objects and advantages of the invention will hereinafter become more fully apparent from the following description of the drawing, which illustrates preferred embodiments thereof, and wherein:

Figure 1 is a top plan view of a small sized lure constructed in accordance with the invention, Figure 2 is a side elevational view of the same, Figure 3 is a longitudinal vertical sectional view, partly in elevation, taken substantially along the plane of the line 3—3 of Figure 1, Figure 4 is a front elevational view of the same, and Figure 5 is a top plan view, partly in section and on a reduced scale, of a slightly different construction of lure.

Referring more particularly to the drawing, wherein like reference characters designate like or corresponding parts throughout the different views, and referring particularly to Figures 1 to 4, 10 designates generally a fishing lure constructed in accordance with the invention, and which includes an elongated lure body 11 which is formed of a buoyant material, such as wood, cork or plastic and which is circular in cross section and which tapers toward its head end 12 and its tail end 13. The buoyant body member 11 is provided with a bore 14 which extends longitudinally therethrough and which is substantially centrally disposed therein. The body member 11 is provided with an outwardly opening spiral groove 15.

A rod or shaft 16 extends loosely through the bore 14 and is provided at its forward end, beyond the head 12, with an eye 17 which is adapted to be connected to a fishing line, not shown, preferably by means of a conventional double swivel. The opposite end of the rod 16 is provided with a similar eye 18 which is adapted to be connected to the shank end of a triple barbed fishhook 19. The rod 16 is of sufficient length so that the eye 18 is spaced a sufficient distance from the tail 13 so that the exposed portion of the rod or shaft 16 can carry the colored bead 20, which is turnably mounted thereon, and which is adapted to function for attracting fish to the lure 10.

A spiral blade 21 has its inner edge disposed in the groove 15. The groove 15 preferably contains a glue or cement, not shown, for anchoring the blade 21 therein, and which is of the type that can be softened by heating. The groove 15 is longer than the blade 21 so that when the glue or cement is softened, as by heating the blade 21, while protecting the body member 11, said blade 21 can be turned relatively to the body member 11 and thereby adjusted longitudinally thereof. The blade 21 is formed of metal, and by thus being adjusted it will function to balance the fishing lure 10.

The sides of the blade 21 are polished. When the lure 10 is drawn through the water the spiral blade 21 will function as an impeller for revolving the body member 11 on the rod or shaft 16, and of course the blade 21 will revolve with the body member, and its polished surfaces will cause it to flash in the water and thus function as a spoon for attracting fish. The blade 21 may be made of a light metal, such as aluminum so that the lure 10 will be rendered buoyant by its buoyant body 11 and will function as a surface plug, or, the blade 21 may be made of a heavier metal the weight of which will be sufficient to counterbalance the buoyancy of the body 11 so that the lure 10 will function as a submerged plug.

The lure 10, as illustrated in Figures 1 to 4, is of a construction adapted particularly for small sized lures, and when the lure is made in larger sizes its construction is modified slightly, as illustrated in Figure 5, by the fishing lure, designated generally 10a. The fishing lure 10a differs from the fishing lure 10 only in that it is provided, intermediate of its ends, with a transverse bore 22, which intersects the longitudinal bore 14 thereof and which is adapted to receive a rod 23. Rod 23 extends transversely through the body member 11a and is provided intermediate of its ends with an opening 24 through which a rod or shaft 16 loosely extends. The ends of the rod 23 project outwardly from the body 11a, between portions of the groove 15 and the blade 21 and said ends are provided with hook receiving eyes 25 for receiving hooks, not shown, similar to the hook 19.

In all other respects, the lure 10a is identical with the lure 10. If desired, the lure 10a could be equipped with single or double instead of triple barbed hooks 19, in order to conform to fishing regulations of certain States or jurisdictions, and likewise, the lure 10 could be provided with a single or double barbed hook instead of the triple barbed hook 19, for the same reason.

It will be obvious that the fishing hook or hooks can be readily removed and replaced on both lures 10 and 10a without in any way having to disassemble the body.

Likewise, the lure 10a can be constructed, as previously described in reference to the lure 10, to function as either a buoyant or a submerged revolving plug or spoon and its balance can be adjusted by movement of the blade 21 lengthwise of the body 11a.

Various modifications and changes are contemplated and may obviously be resorted to, provided they fall within the spirit and scope of the invention as hereinafter defined by the appended claims, as only preferred embodiments of the invention have been disclosed.

I claim as my invention:

1. A fish lure comprising a body member provided with a spiral groove, a spiral blade having its inner edge slidably disposed in said groove and extending more than one half the distance around the body, said body being provided with a bore extending longitudinally therethrough, a rod extending through said bore and loosely mounted therein, said rod being provided at its forward end with a line receiving eye, disposed beyond or forwardly of the head of the body member, and said rod being provided at its opposite end with a hook receiving eye disposed rearwardly of the tail of the body member.

2. A fish lure as in claim 1, said spiral groove being substantially longer than the spiral blade, said spiral blade being adjustable relatively to the groove for balancing the lure.

3. A lure as in claim 1, said body member being buoyant, said blade being formed of a non-buoyant material and being of a length substantially less than the length of the groove in the body member whereby said blade may be adjustably positioned relatively to the body member for balancing the lure.

4. A lure as in claim 1, said body member being formed of a buoyant material, said blade being formed of metal and being of sufficient weight to render the lure non-buoyant, the length of said blade being less than the length of said spiral groove, and said blade being adjustable relatively to the groove for balancing the lure.

5. A lure as in claim 1, comprising a rod extending transversely through said body member, intermediate of its ends, said last mentioned rod having an opening intermediate of its ends through which said first mentioned rod loosely extends, the ends of said last mentioned rod projecting from said body member, between portions of its spiral groove, and said ends being provided with hook receiving eyes.

DONALD C. BRETT.